(12) United States Patent
Keinänen et al.

(10) Patent No.: US 9,798,452 B2
(45) Date of Patent: Oct. 24, 2017

(54) HANDLING INFORMATION ITEMS (75) Inventors: Anne Keinänen, Jokirinne (FI); Virve Inget, Oulu (FI); Anna-Maija Ohlsson, Turku (FI); Jennica Falk, Rødovre (DK); Tiiu Koort-Fallström, Valkeakoski (FI)

(73) Assignee: Nokia Technologies Oy, Espoo (FI)

( * ) Notice: Subject to any disclaimer, the term of this patent is extended or adjusted under 35 U.S.C. 154(b) by 978 days.

(21) Appl. No.: 14/112,163

(22) PCT Filed: Apr. 17, 2012

(86) PCT No.: PCT/IB2012/051907
§ 371 (c)(1),
(2), (4) Date: Feb. 3, 2014

(87) PCT Pub. No.: WO2012/143848
PCT Pub. Date: Oct. 26, 2012

(65) Prior Publication Data
US 2014/0181681 A1    Jun. 26, 2014

(30) Foreign Application Priority Data
Apr. 18, 2011    (GB) .................................. 1106532.3

(51) Int. Cl.
*G06F 3/00*    (2006.01)
*G06F 3/048*    (2013.01)
(Continued)

(52) U.S. Cl.
CPC ......... *G06F 3/04842* (2013.01); *G06Q 10/06* (2013.01); *H04M 1/274508* (2013.01); *H04M 1/72566* (2013.01)

(58) Field of Classification Search
None
See application file for complete search history.

(56) References Cited

U.S. PATENT DOCUMENTS 7,869,833 B2 * 1/2011 Kim ...................... G06Q 10/02
                                                              455/466
7,890,889 B2 * 2/2011 Artman ............. G06F 17/30997
                                                              707/722
(Continued)

FOREIGN PATENT DOCUMENTS

CN    1971597 A    5/2007
EP    2 073 517 A1    6/2009
(Continued)

OTHER PUBLICATIONS

International Search Report and Written Opinion for Application No. PCT/IB2012/051907 dated Oct. 3, 2012.
(Continued)

*Primary Examiner* — Yongjia Pan
(74) *Attorney, Agent, or Firm* — Alston & Bird LLP (57) ABSTRACT

A method comprises receiving, via a user interface of a user terminal, an indication of a user selection of a contact identifier, identifying, from plural event information items stored in at least one memory, an event information item which is associated with the selected contact, wherein each of the plural event information items has a timestamp associated therewith, and causing a graphical chronology to be displayed on a display (14) of the user terminal, wherein the graphical chronology comprises plural sub-regions (50-1-50-3) each relating to a different time interval, wherein the graphical chronology includes a graphical representation of the identified event information item (53, 55), the graphical representation being located in a one of the sub-regions (50-1-50-3) based on a comparison of the timestamp associated with the identified event information item and the time interval to which the sub-region (50-1-50-3) relates.

20 Claims, 4 Drawing Sheets

(51) Int. Cl.
  G06F 3/0484 (2013.01)
  G06Q 10/06 (2012.01)
  G06F 3/14 (2006.01)
  H04M 1/2745 (2006.01)
  H04M 1/725 (2006.01)

(56) References Cited

U.S. PATENT DOCUMENTS

| | | | |
|---|---|---|---|
| 8,208,905 B2* | 6/2012 | Lee | G06F 17/30867 455/403 |
| 8,229,411 B2* | 7/2012 | Stallings | G06F 3/0485 455/418 |
| 8,423,088 B2* | 4/2013 | Ickman | G06F 17/30867 345/440 |
| 8,543,928 B2* | 9/2013 | Stovicek | G06Q 10/10 379/201.12 |
| 8,600,343 B2* | 12/2013 | Brezina | H04M 15/00 455/405 |
| 8,751,960 B2* | 6/2014 | Becker | G06F 17/30873 715/810 |
| 2003/0014395 A1 | 1/2003 | Ruvolo et al. | |
| 2004/0119761 A1* | 6/2004 | Grossman | G06Q 10/10 715/854 |
| 2004/0221309 A1* | 11/2004 | Zaner | G06Q 10/10 725/46 |
| 2005/0243979 A1 | 11/2005 | Starbuck et al. | |
| 2007/0067439 A1* | 3/2007 | Mason | H04L 51/04 709/224 |
| 2007/0083623 A1 | 4/2007 | Nishimura et al. | |
| 2007/0124371 A1* | 5/2007 | Desai | G06Q 10/107 709/204 |
| 2008/0081594 A1* | 4/2008 | Lee | H04M 1/72566 455/412.2 |
| 2008/0162649 A1 | 7/2008 | Lee et al. | |
| 2008/0182568 A1* | 7/2008 | Kim | H04M 1/2745 455/418 |
| 2008/0256107 A1* | 10/2008 | Banga | G06Q 10/00 |
| 2009/0029674 A1 | 1/2009 | Brezina et al. | |
| 2009/0252312 A1* | 10/2009 | Muniz | H04M 1/72547 379/112.01 |
| 2009/0254608 A1* | 10/2009 | Butt | G06Q 10/109 709/203 |
| 2009/0287687 A1* | 11/2009 | Martire | G06Q 30/02 |
| 2010/0162170 A1* | 6/2010 | Johns | G04G 9/06 715/834 |
| 2010/0211917 A1* | 8/2010 | Tsuei | H04M 1/236 715/840 |
| 2011/0119596 A1* | 5/2011 | Nesladek | G01C 21/265 715/739 |
| 2011/0130168 A1* | 6/2011 | Vendrow | H04M 1/57 455/556.1 |
| 2011/0154208 A1 | 6/2011 | Horii | |
| 2011/0170682 A1* | 7/2011 | Kale | H04L 29/12198 379/218.01 |
| 2011/0193878 A1* | 8/2011 | Seo | H04M 1/72544 345/619 |
| 2011/0197163 A1* | 8/2011 | Jegal | G06F 3/0482 715/811 |
| 2012/0260189 A1* | 10/2012 | Howard | H04M 1/72552 715/739 |

FOREIGN PATENT DOCUMENTS

| | | |
|---|---|---|
| EP | 2 219 351 A1 | 8/2010 |
| JP | 2004-229214 A | 8/2004 |
| WO | WO 2009/023483 A1 | 2/2009 |
| WO | WO 2012/080786 A2 | 6/2012 |

OTHER PUBLICATIONS

Search Report for European Application No. EP 12 77 4335 dated Oct. 22, 2014.

* cited by examiner

HANDLING INFORMATION ITEMS

FIELD OF THE INVENTION

The invention relates to the handling of information items. More specifically, the invention relates the handling of event information items.

BACKGROUND

Portable electronic devices are often used as diaries to enable users to keep track of future appointments and to keep records of past events.

SUMMARY OF THE INVENTION

In a first aspect, this specification describes method comprising receiving, via a user interface of a user terminal, an indication of a user selection of a contact identifier, identifying, from plural event information items stored in at least one memory, an event information item which is associated with the selected contact, wherein each of the plural event information items has a timestamp associated therewith, and causing a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

In a second aspect, this specification describes computer-readable instructions which, when executed by at least one processor, cause the at least one processor to perform a method according to the first aspect.

In a third aspect, this specification describes Apparatus comprising at least one processor and at least one memory having computer-readable instructions stored thereon, the computer-readable instructions, when executed by the at least one processor, causing the at least one processor to receive, via a user interface of a user terminal, an indication of a user selection of a contact identifier, to identify, from plural event information items stored in at least one memory, an event information item which is associated with the selected contact, wherein each of the plural event information items has a timestamp associated therewith, and to cause a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

In a fourth aspect, this specification describes apparatus comprising means for receiving, via a user interface of a user terminal, an indication of a user selection of a contact identifier, means for identifying, from plural event information items stored in at least one memory, an event information item which is associated with the selected contact, wherein each of the plural event information items has a timestamp associated therewith, and means for causing a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

The apparatus may comprise means for identifying, from plural contact information items stored in the at least one memory, a contact information item which is associated with the selected contact identifier, wherein a graphical representation of the identified contact information item is located in a one of the sub-regions of the graphical chronology. The graphical representation of the identified contact information item may be located in a sub-region which relates to a time interval which includes a current time.

The apparatus may comprise means for responding to a user selection of the graphical representation of the contact information item by causing a communication application to be launched, the communication application using the contact information item to allow the user of the user terminal to communicate with a contact associated with the selected contact identifier.

The apparatus may comprise means for responding to a user selection of the graphical representation of the event information item by causing information associated with the event information item to be displayed.

The apparatus may comprise means for initially causing a first set of the plural sub-regions of the graphical chronology to be displayed, the first set including a sub-region relating to a time interval which includes a current time, and means for subsequently, responding to a user input by causing a second set of the plural sub-regions to be displayed, the second set including at least one different sub-region not included in the first set. If the user input indicates a first direction, the at least one different sub-region may relate to a time interval which is subsequent to the current time, and if the user input indicates a second direction, the at least one different sub-region may relate to a time interval which is prior to the current time.

The apparatus may comprise means for identifying, from plural other information items stored in the at least one memory, an other information item which is associated with the selected contact and which has an associated timestamp which identifies a time which is subsequent to a time at which the graphical chronology was last caused to be displayed, means for initially causing a first set of sub-regions to be displayed on the display, the first set of sub-regions including a sub-region in which a graphical representation of the identified other information item is located, and means for subsequently causing a second set of sub-regions to be displayed.

In a fifth aspect, this specification describes apparatus configured to receive, via a user interface of a user terminal, an indication of a user selection of a contact identifier, to identify, from plural event information items stored in at least one memory, an event information item which is associated with the selected contact, wherein each of the plural event information items has a timestamp associated therewith, and to cause a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

In a sixth aspect, this specification describes at least one non-transitory memory medium having computer readable code stored thereon, the computer-readable code, when executed by at least one processor, causing the at least one processor to receive, via a user interface of a user terminal, an indication of a user selection of a contact identifier, to identify, from plural event information items stored in at least one memory, an event information item which is associated with the selected contact, wherein each of the plural event information items has a timestamp associated therewith, and to cause a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

BRIEF DESCRIPTION OF THE DRAWINGS

For a more complete understanding of example embodiments of the present invention, reference is now made to the following description taken in connection with the accompanying drawings in which.

DETAILED DESCRIPTION OF THE EMBODIMENTS

In the description and drawings, like reference numerals refer to like elements throughout.

Figure 1:
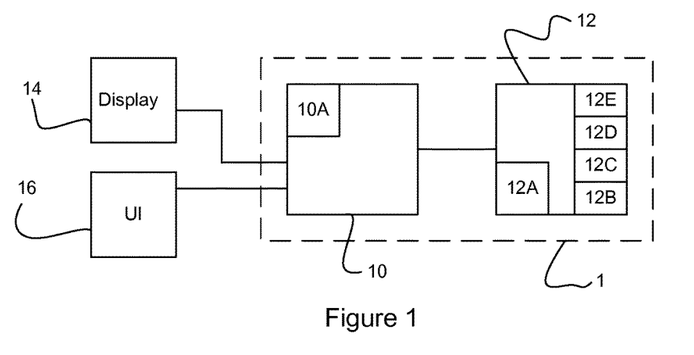
FIG. 1 is a schematic illustration of apparatus according to example embodiments of the invention.

FIG. 1 is a schematic illustration of apparatus 1 according to example embodiments of the invention.

The apparatus 1 of FIG. 1 is operable to prepare, and to cause to be displayed, a contact-specific graphical chronology for consumption by a user of a user terminal. In this specification, a graphical chronology refers to an arrangement of graphical representations arranged in date-order, and optionally also time-order, in dependence on a timestamp associated with each graphical representation. The graphical chronology comprises plural sub-regions each representing a different time interval. The plural sub-regions may be arranged linearly, so to form a timeline. The graphical representations are located in a sub-region corresponding to a time interval into which the time indicated by the associated timestamp falls. A graphical representation comprises a graphical indicator which represents an information item stored in a memory. A graphical representation may indicate a type of the information item with which it is associated. This may be achieved in any suitable way, for example, using text, images, shapes or colours etc. The graphical representation may also include information which has been extracted from the information item. A graphical representation may comprise a link which, when selected, causes either content associated with the representation to be displayed or an application associated with the representation to be launched. The graphical chronology is "contact-specific" because each of the graphical representations is associated with a particular contact which has been specified by the user of the user terminal. The graphical chronology, information items and graphical representations are discussed in more detail below.

The apparatus 1 of FIG. 1 comprises a controller 10 and at least one memory 12. The controller 10 is in communication with the at least one memory 12 and is operable retrieve data from the memory 12 and to store data in the memory 12. The controller 10 is operable to perform operations, under the control of computer-readable instructions 12A stored in the memory 12.

The controller 10 is in communication with a display 14 and a user interface 16. Consequently, the controller 10 is operable to cause images to be displayed on the display 14. The controller 10 is operable also to receive indications of user inputs via the user interface. The controller is operable perform operations based on the received indications. As will be appreciated from the below examples, the controller 10 may be in physical, wired communication or remote, wireless communication with the display 14 and the user interface 16. Although not shown in FIG. 1, the user interface 16 and the display 14 are located in a first user terminal, which is associated with a first user.

The controller 10 comprises at least one processor 10A, which is operable to execute the computer-readable 12A instructions stored in the memory 12. The at least one processor 10A may comprise any combination of different types of processor, microprocessor or other type of processing means. The controller 10 may also comprise one or more application specific integrated circuits (ASICS) (not shown in FIG. 1).

The at least one memory 12 comprises a portion for storing the computer-readable instructions 12A. The at least one memory 12 also comprises a portion 12B for storing event information items and a portion 12C for storing contact information items. These portions of the memory 12 are hereafter referred to as the event database 12B and the contact database 12C respectively.

Contact information items are items for allowing the user to communicate with a particular contact. These include, for example, telephone numbers, email addresses and postal addresses associated with a contact. Each contact information item is stored in association with a particular contact identifier that identifies the contact to which the contact information item relates.

Event information items relate to events that have already occurred or are scheduled to occur in the future. The event information items may include calendar information items and correspondence information items. Correspondence information items relate to correspondence that has occurred between the user of the user terminal and a contact. Correspondence information items include sent and received messages (such as SMS, MMS and email messages) and records of received and outgoing telephone calls. Calendar information items relate to calendar entries, both past and future.

Each of the event information items has a timestamp associated therewith. The timestamp associated with a calendar information items may, for example, indicate a time at which an occasion (to which the calendar entry relates) occurred or is scheduled to occur. The timestamp associated with a correspondence information item may, for example, indicate a time at which the correspondence occurred.

Each of the event information items is associated with one or more contact identifier. Correspondence information items may be associated with an identifier when the contact associated with the identifier was involved with the correspondence. Calendar information items may be associated with the identifier as a result of the contact with whom the identifier is associated being a participant of the occasion (which may be for example a business meeting or a social engagement etc.).

In the example of FIG. 1, the memory 12 also includes a portion 12D for storing information items the provision of which has been authorised by the contact to which they relate. These items are hereafter referred to as contact-authorised information items. The portion in which they are stored is hereafter referred to as the contact-authorised information database 12D. These items may include location information items identifying a contact's current or previous location, status information items identifying a contact's current or previous status, and images or videos associated with the contact. Each of these items is stored in association with a contact identifier. The contact-authorised information items have timestamps associated therewith. For example, a timestamp associated with a location information item may indicate a time at which the contact was at that location. Similarly, a timestamp associated with a status information item may indicate the time at which the status was updated by the contact.

Also, in the example of FIG. 1, the memory 12 includes a portion 12E for storing category indicators. Category indicators are associated with a contact identifier and relate to categories or subjects which are of interest to the contact. The portion for storing the category indicators is hereafter referred to as the category database 12E. It will be appreciated that the category indicators may, like the contact-authorised information, be provided at the discretion of the contact with which they are associated.

Each of the above described databases 12B-12E, in some examples, may be reserved for use only by single a user. In such examples, the information items and category indicators in the databases 12B-12E may be associated with a plurality of different contact identifiers, but may be accessible only by the particular user.

In other examples, the databases 12B-12E may be for use by many different users. In these examples, the stored information items and category indicators may be stored in association with different contact identifiers, but may also be stored in association with one or more user identifiers identifying users who are permitted to access them.

Figure 2:
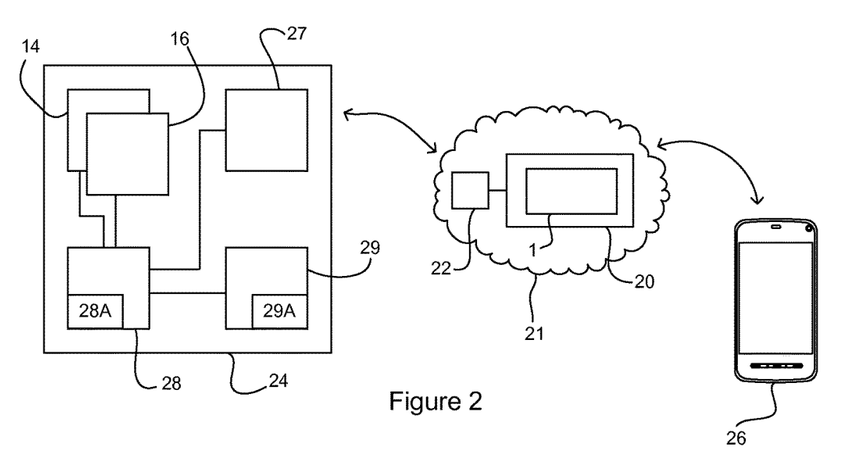
FIG. 2 is a schematic illustration of an example communication system in which apparatus according to example embodiments of the invention may be provided.

FIG. 2 shows a communication system 2 in which the apparatus 1 of FIG. 1 may reside. In the example of FIG. 2, the apparatus 1 is part of a server 20. The server 20 is located in a network 21. The display 14 and the user-interface 16 are located in a first user terminal 24. The server 20 is in communication with a transceiver 22, which is operable, under the control of the controller 10, to transmit data signals to the first user terminal 24. The transceiver 22 is operable also to receive data signals from the first user terminal 24. The controller 10 is operable to perform operations in response to receiving these signals.

In the example of FIG. 2, first user terminal comprises a controller 28 and at least one memory 29. The controller 28 comprises at least one processor 28A which is operable under the control of computer-readable instructions 29A stored in the at least one memory 29 to perform operations and to control the other components of the first user terminal 24. The first user terminal 24 also comprises a transceiver 27 for sending signals to, and receiving signals from the server 20. The display 14 is operable under the control of the controller 30 to display images, based on data signals from the server 20. The user interface 16 is operable to receive user inputs and to send signals indicative of such to the controller 30. The controller 30 is configured to respond to the receipt of these signals to perform operations. The operations may include altering images displayed on the display and/or causing signals indicative of the user input to be sent to the server 20. In addition, the controller 28 of the first terminal may be operable to cause images such as the graphical chronology, to be displayed on the display based on signals received from the server 20.

In some examples, the user interface 16 comprises a touch-sensitive transducer, which is overlaid on the display 14 to form a touchscreen 34, 36. It will be appreciated that the user interface 36 may, in other examples, comprise a different type of user interface 36, such as, but not limited to, mechanicals keys, a scroll wheel, a track ball and a voice recognition user interface.

The first user terminal 24 may comprise, but is not limited to, a desktop computer, a laptop computer, a palmtop computer, a tablet computer, a personal digital assistant, a mobile telephone, an audio player or an e-reader.

In the example of FIG. 2, the system also comprises a second user terminal 26. The second user terminal 26 may be similar to the first user terminal 24. The second user terminal 26 is operable to cause contact-authorised information items and category indicators to be sent to the server 20. These may be transmitted indirectly via an intermediary service provider (not shown), such as a social networking service provider. The category indicators and contact-authorised information items received from the second user terminal 26 are associated with a contact identifier which identifies a user of the second terminal 26.

Figure 3:
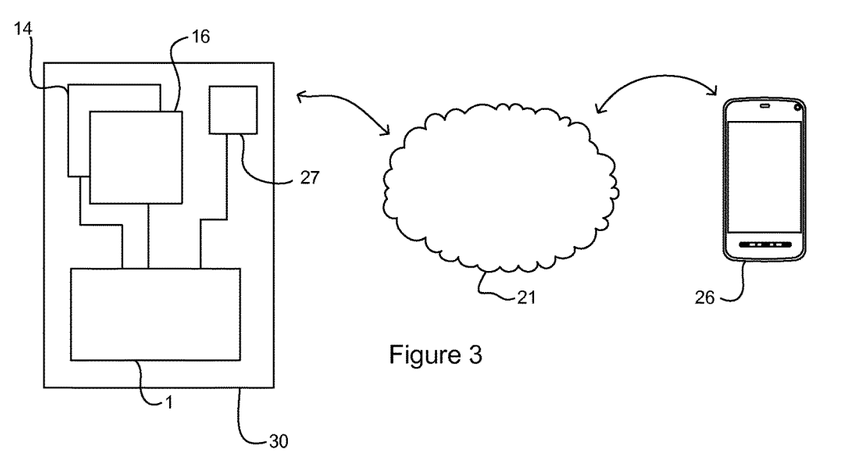
FIG. 3 is a schematic illustration of an alternative example communication system in which apparatus according to example embodiments of the invention may be provided.

FIG. 3 shows an alternative example arrangement to that shown in FIG. 2. In this example arrangement, the apparatus 1 is provided in the first user terminal 30. The first user terminal 30, in this example, also comprises the display 14, the user interface 16 and the transceiver 27. In this example, the first user terminal 30 is operable to receive data signals comprising category indicators and contact-authorised information items from the second user terminal 26 directly or via the network 21 (which may include one or more intermediary servers).

A method according to example embodiments of the invention will now be described with reference to the flow chart of FIG. 4 and the example screen-shots of FIGS. 5A to 5D.

In step S1, the controller 10 of the apparatus 1 receives an indication of a user selection of a contact. The indication may include a contact identifier associated with the selected contact. The user selection of the contact is provided via the user interface 16 of the first user terminal 24, 30 for example by selecting a particular contact from a list of contacts or by typing the name of the contact.

In step S2, the controller 10 identifies one or more event information items from the event database 12B which are associated with the selected contact. In examples in which the event database 12B is reserved for use only by the first user, the controller 10 may identify the event information items by comparing an identifier associated with the selected contact with contact identifiers stored in association with the event information items. Those items which have a contact identifier matching the identifier of the selected contact are identified as being associated with the selected contact. In examples in which the event database 12B is for use by multiple different users, the controller 10 may identify the event information items based on a contact identifier associated with the item, but also based on a user identifier associated with the item. Those items which have a contact identifier matching the identifier of the selected contact and which have a user identifier associated with the user of the user terminal are identified. The identifier of the user may be received with the user-selection indication of step S1.

Next, in step S3, the controller 10 identifies one or more contact information items associated with the selected contact from the contact database 12C. These may be identified in a manner similar to that described with reference the identification of the event information items.

In step S4, the controller 10 identifies one or more contact-authorised information items from the contact-authorised information database 12D. These may be identified in a manner similar to that described with reference the identification of the event information items.

In step S5, the controller 10 identifies one or more category indicators associated with the selected contact. In step S6, the identified category indicators are used to search for one or more suggested event information items. Each of the suggested event information items has an associated timestamp which indicates the time at which the suggested event is scheduled to take place.

Suggested event information items relate to future events which are identified using the identified category indicators. Thus, suggested event information items relate to events which are of interest to the selected contact. Identification of the suggested event information items may be carried out in any suitable way, for example, by comparing the identified category indicators with indicators stored in association with a plurality of future event items. A plurality of future event items from which one or more suggested event items are identified may be stored in the at least one memory. The future event items may, alternatively or in addition, be stored in a remote database or databases. In some examples, the controller 10 may create suggested event items based on the results of an internet search of upcoming events using the category indicators. The controller 10 may create a suggested event item by using information from the resource identified by the internet search.

In some examples, the suggested event information items may be identified based on category indicators associated with the selected contact and based on category indicators associated with the first user. In these examples, a suggested event information item may be created or identified only when a future event is related to both a category indicator associated with the selected contact and a category indicator associated with the first. Category indicators specifying categories of interest to the user of the first terminal may be pre-stored in the memory 12. In this way, suggested event information items are only identified or created when the future event to which they relate is of interest to both the user and the selected contact.

Contact-authorised information items and/or suggested event information items may be referred to as "other information items".

Next, in step S7, the controller 10 causes a first region of a graphical chronology to be displayed on the display 14.

Figure 5A:
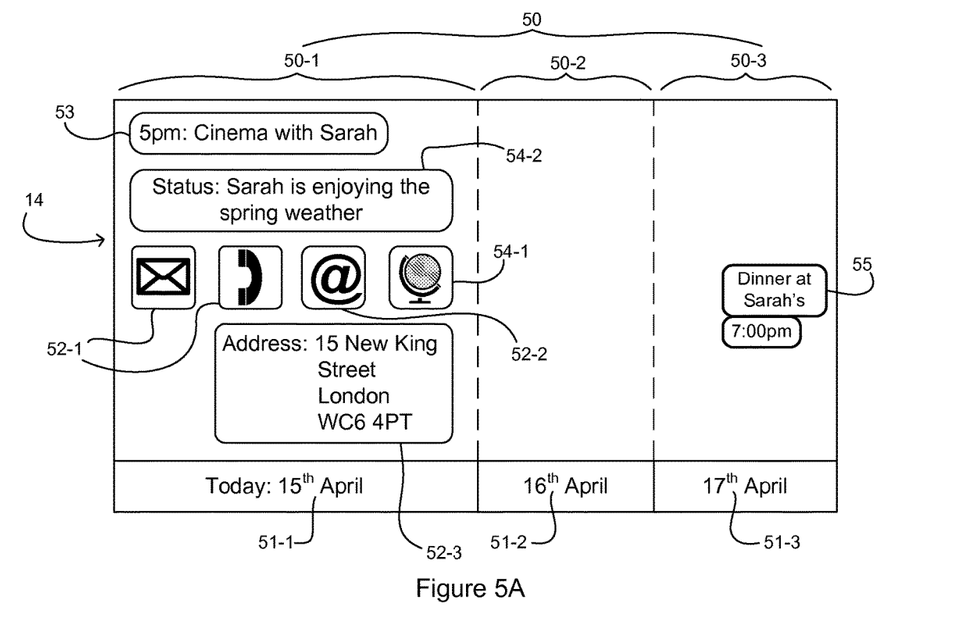
FIGS. 5A to 5D are examples of a display screen at various stages throughout the method of FIG. 4.
Figure 5B:
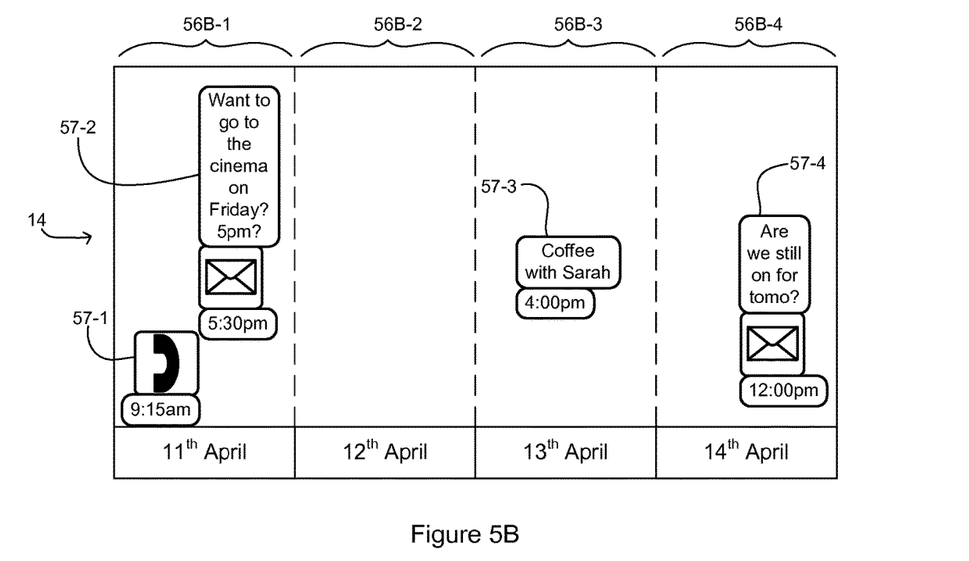

In the example of FIG. 5B, the first region 50 of the graphical chronology comprises at least a first sub-region 50-1, the first sub-region 50-1 being associated with a time interval which includes the current time. The first region 50 may be referred to as a first set of sub-regions. In this example, the first sub-region 50-1 is associated with a time interval of one day (i.e. today's date). The first sub-region 50-1 has a displayed label 51-1 associated with it. The label 51-1 indicates, to the user, the time interval with which the sub-region 50-1 is associated.

Figure 4:
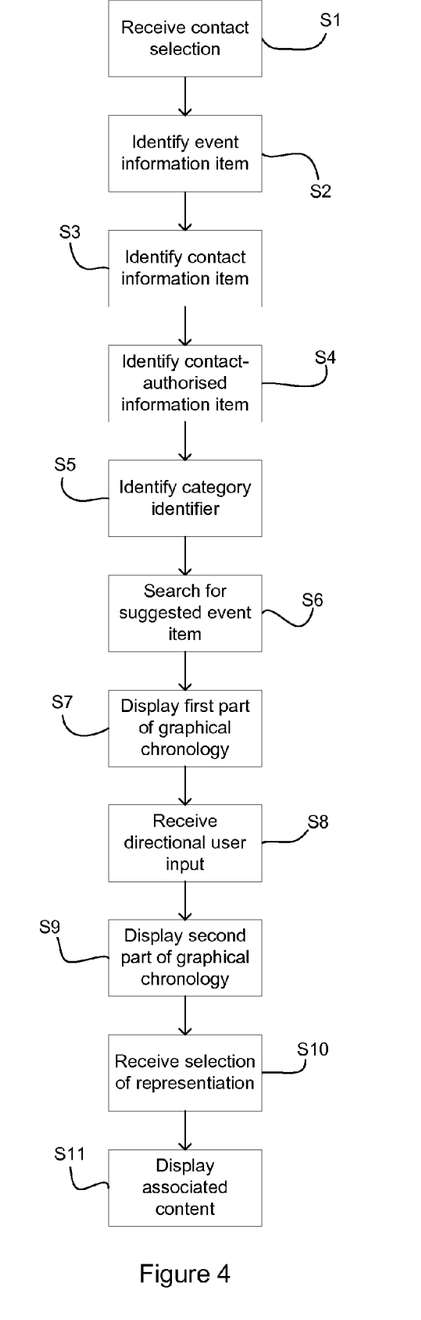
FIG. 4 is a flow chart illustrating a method according to example embodiments of the invention.

Located within the first sub-region 50-1 is at least one graphical representation 52 associated with the one or more contact information items identified in step S3 of FIG. 4. In other words, a representation 52 associated with at least one contact information item is located in region of the graphical corresponding to a current time. The at least one graphical representation 52 indicates a type of the one or more contact information items. In this example, there are four graphical representations 52 associated with the one or more contact information items. Two of these 52-1 represent the contact's telephone number, one 52-2 represents the contact's email address and the other 52-3 represents the contact's postal address. In this example, the graphical representations 52 indicate the types of the contact items using images (for the telephone number and email address) and text (for the postal address). The graphical representation 52-3 associated with the postal address includes information (in this case, text) extracted from postal address information item.

One or more of the graphical representations 52 may comprise a link to content associated with the particular contact information item. For example, the controller 10 may respond to a user selection in respect of the representation 52-3 associated with the contact's postal address, by causing a map, which includes the postal address, to be displayed. One or more of the graphical representations 52 may comprise a link to a software application associated with the particular contact information item. For example, the controller 10 may respond to a user selection in respect of the representation 52-2 associated with the user's email address by causing an email application to be launched. The email application may allow the user to compose an email to the contact's email address.

In the example of FIG. 5A, the first sub-region 50-1 also has located therein a graphical representation 53 associated with an identified event information item, which is in this example a calendar information item. The representation 53 includes information, in this example a time of day ("5 pm") and text describing the occasion ("Cinema with Sarah"). The representation 53 is located within the graphical chronology at a location specified by a timestamp associated with the calendar information item. The representation 53 may comprise a link which, when selected, causes the content information item to be displayed. This may be useful when not all of the information contained within the information item is provided by the representation (for example, because the information item contains too much information). Alternatively or in addition, the selection of the representation may cause a map including a location at which the occasion is planned to take place. This may be displayed based on location information provided in the calendar information item.

Also located within the first sub-region 50-1 are two graphical representations 54 associated with two contact-authorised information items. A first of the representations 54-1 represents a location information item of the contact (in this case, a current location) and the second represents a status of the contact (in this case, updated today). As the location is current and the status was updated today, the timestamps associated with these items indicate the current date. As such, the graphical representations 54 are provided in a region of the chronology associated with a time interval which includes the current time. Selection of the representation 54-1 associated with the contact's current location may cause a map which indicates the contact's current location to be displayed on the display 14.

In the example of FIG. 5A, the first region 50 of the graphical chronology includes at least one additional sub-region 50-2, 50-3 (in this case, two sub-regions 50-2, 50-3). As with the first sub-region 50-1, each of the additional sub-regions 50-2, 50-3 comprises a label 51-2, 51-3 which indicates the time interval with which the sub-region 50-1 is associated. The sub-regions 50-1, 50-2, 50-3 are arranged in a linear fashion thereby to form a timeline. In this example, the at least one additional sub-region 50-2, 50-3 is associated with a time interval (or intervals) which are immediately subsequent to the time interval with which the first sub-region 50-1 is associated (i.e. the time interval associated with the current time). As such, in this example, the additional sub-regions 50-2, 50-3 represent the two days subsequent to the current day. It will be appreciated, however, that the additional sub-region may instead relate to time intervals immediately prior to the time interval with which the first sub-region 50-1 is associated. Alternatively, where there are two or more additional sub-regions, at least one of these may relate to a time interval immediately preceding the time interval with which the first sub-region 50-1 is associated, and at least one other of these may relate to a time interval immediately subsequent to time interval with which the first sub-region 50-1 is associated.

In FIG. 5A, one of the additional sub-regions 50-2 includes no representations located therein. The reason for this is that none of the information items identified in steps S2 to S6 have timestamps denoting a time falling within the time interval with which the sub-region 50-2 is associated. The other additional sub-region 50-3 has located therein a graphical representation 55 associated with an event information item which, in this example, is a calendar information item. As with the first sub-region 50-1, each of the additional sub-regions 50-2, 50-3 comprises a label 51-2, 51-3 which indicates the time interval with which the sub-region 50-1 is associated.

Returning now to FIG. 4, in step S8, a directional user input is received via the user interface 16. In step S9, the controller 10 responds to the user input by causing a second region of the graphical chronology to be displayed on the display.

Figure 5C:
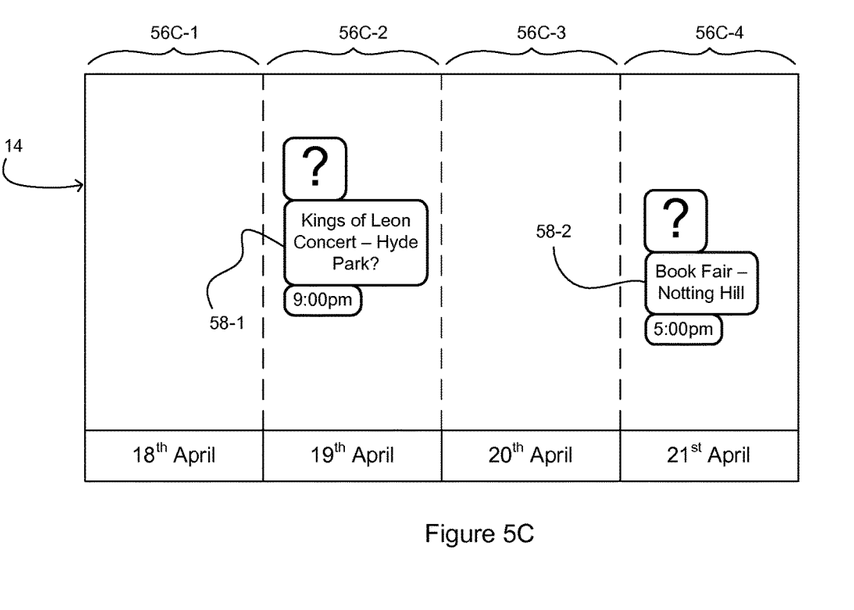

FIGS. 5B and 5C show examples of second regions 56B, 56C of the graphical chronology that are displayed in response to receipt of different directional user inputs. The second regions 56B, 56C may be referred to as second sets of sub-regions.

The region 56B shown in FIG. 5B is caused to be displayed in response to a user input in a first direction. This region includes sub-regions 56B-1 to 56B-4 representing time intervals immediately preceding the time interval associated with the first sub-region of the first region (i.e. the current time interval). As such, the sub-regions represent time intervals that are in the past. In the examples of FIG. 5A to 5C, the direction of time is from left to right. As such, in this example, the first direction is a direction indicating that a region of the chronology to the left of the first region is to be displayed. This user input could comprise, for example, an input for causing the first region 50 of the chronology to be moved to the right and thereby causing a region that is to the left be displayed on the display. In embodiments wherein the user interface 16 is a touch sensitive transducer, this input may comprise dragging a finger along the transducer from left to right.

The region 56B of the chronology depicted in FIG. 5B comprises four sub-regions 56B-1 to 56B-4 representing the four time intervals prior to the current time interval. In this example, a first of the sub-regions 56B-1, which represents the eleventh of April, includes two graphical representations 57-1, 57-1. A first of these 57-1 represents a voice communication carried out between the user and the contact. The second graphical representation 57-2 represents a text message exchanged between the user and the contact. Both of the graphical representations 57-1, 57-2 indicate the type of the event information item, in this example using an icon indicative of the type of event. Both of the graphical representations 57-1, 57-2 also indicate a time of day at which the event occurred. The second of representation 57-2 also includes a region of the information from the event information item, which is in this case text from the text message.

The first and second representations 57-1, 57-2 are arranged relative to one another within the sub-region 56B-1 based on the time at which they occurred (which is indicated by their associated timestamps). In this example, the representations 57-1, 57-2 are arranged such that the representation relating to the earlier event is closer to the bottom of the sub-region 56B-1. It will be appreciated, however that plural representations provided within the same sub-region may be arranged relative to one another in any way suitable for indicating an order, or an actual time, of the events with which the graphical representations are associated. It will be appreciated also that a single representation may be located within a sub-region so as to indicate the relative point within the time interval at which the event occurred (which is determined based on the associated timestamp.

The third and fourth sub-regions 56B-3, 56B4 depicted in FIG. 5B each include a representation associated with an event information item, in this case a calendar information item and a correspondence information item. The second sub-region 56B-2 has no graphical representations located therein.

FIG. 5C show an example of a second region 56C of the graphical chronology that is displayed in response to receipt of directional user input indicating a second direction that is different to the first direction. The sub-regions 56C-1-56C-4 depicted in FIG. 5C relate to time intervals immediately subsequent to the intervals relating to the sub-regions of the first region 50. The first region 50 included a sub-region representing a current time and so, consequently, the sub-regions depicted in FIG. 5C relate to time intervals associated with times that have not yet occurred.

In FIG. 5C, each of the second and fourth sub-regions 56C-2, 56C-4 include a graphical representation associated with a suggested event information item. These representations 58-1, 58-2 indicate a type of the information item (in this example a question mark indicates a suggested event item), a time of the event, and information (in this example, a brief description of the event) from the suggested event information item. Each representation is located within its sub-region based on a time stamp associated therewith. As discussed above, the suggested event items relate to events of interest to the contact, and optionally also of interest to the user of the user terminal 24, 30.

Figure 5D:
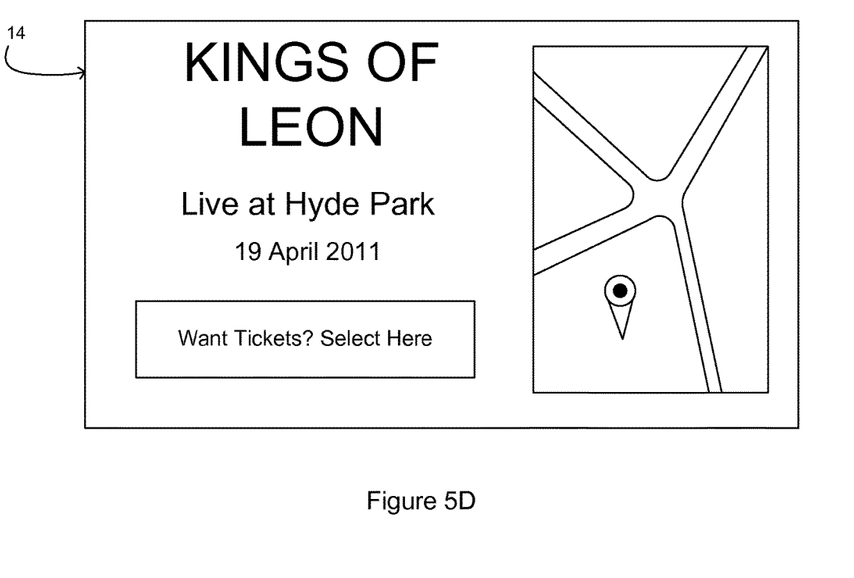

Returning now to FIG. 3, in step S10, a user selection of one of the graphical representations is received via the user interface. The controller 10 responds to this by causing content associated with the information item which the selected representation represents to be displayed on the display 14. In this example, the graphical representation 58-1 located in the second sub-region 56C-2 depicted in FIG. 5C is selected. FIG. 5D shows the content associated with the selected representation displayed on the display 14. The content may comprise information from the information item, or may be retrieved from a remote source, such as the internet.

In the example of FIG. 5A, the first region 50 of the graphical chronology that is initially displayed in step S7 comprises plural sub-regions 50-1, 50-2, 50-3. It will be appreciated, however, that the first region 50 may comprise only the sub-region of the graphical chronology which represents the current time interval.

In FIG. 5A, it can be seen that the first sub-region 50-1 is larger in area than the other two sub-regions 50-2, 50-3. This is because, in some examples, the controller 10 is operable to increase one or more dimensions of a sub-region in dependence on the number of graphical representations to be located within that sub-region. For example, the controller 10 may increase the size of a sub-region from a standard size to an increased size if the total size of the representations to be displayed in sub-region is larger than the standard size. Alternatively, in other examples, the controller 10 may decrease the size of one or more of the representations from a standard size to a smaller size, if it is determined that the total size of the representation is too large for the sub-region. In some examples, the controller 10 may be operable to omit from display, or to shrink, sub-regions which do not have any graphical representations located therein.

In the example discussed in FIG. 5, each of the time intervals relates to one 24 hour period. However, it will be appreciated that time intervals of different durations may be used instead. Furthermore, in some examples, the controller 10 is operable to provide different sub-regions which relate to time intervals of different durations. For example, the time intervals may be of a shorter duration when they relate to times that are closer to the current time. For example, a current day may be split into plural sub-regions each representing time intervals of one hour. Days immediately preceding and immediately subsequent to the current day may be divided into two sub-regions each representing a twelve-hour time interval. All other days in the chronology may be represented by just one sub-region.

The graphical chronology may be zoomable. For example, the controller 10 may be responsive to receipt of a magnify (or zoom-in) command to a split sub-region representing a time interval of one day into a plurality sub-regions each representing a portion of that day.

In the example of FIGS. 5A to 5C the chronology is displayed as timeline from left to right. It will be appreciated however, that the chronology may alternatively be presented from right to left, from top to bottom or from bottom to top.

It will, of course, be understood that the order of steps described in relation to FIG. 4 is merely an example. Thus, in some examples steps S2 to S6 may be performed in any order as long as step S5 is before step S6. In other examples, a graphical chronology relating to each of a plurality of contacts of the user of the terminal 24, 30 may have been prepared for display prior to receiving the selection of the contact in step S1. As such, in some examples, steps S2 to S6 may be performed prior to step S1.

Although not shown in FIG. 5A to 5C, it will be understood that sub-regions of the chronology, which are further in the past or future may be caused to be displayed by providing multiple user inputs either of the first and second directions. It will also be understood that the controller is, in some examples, operable to respond to a directional user input by moving the chronology along the display by just one sub-region. As such, in response to a directional user input, the controller 10 may be operable to sub-region from a first edge of the display and to replace it with a different sub region at the opposite edge of the display 14. In other words, in these examples, the first set and second sets of sub-regions may include one or more, but not all, of the same sub-regions. It will thus be understood that the graphical chronology is scrollable.

In the above description, it has been described that each of the operation is caused to be performed by the controller 10 of the apparatus 1. However, in examples such as that shown in FIG. 2, some of the operations (such as, for example, steps S8 and S11) described with reference to FIG. 4 may be caused instead by the controller 28 of the first user terminal.

In some examples, when a graphical chronology associated with a contact is caused to be displayed, the set of sub-regions that are initially displayed on the display (e.g. before the receipt of user inputs) may include a sub-region in which is located a graphical representation associated with an information item that has been added to one of the databases 12B-12E since the chronology associated with that contact was last caused to be displayed by the first user terminal. If more than one new information item has been added since the time the chronology was last viewed, the chronology may be controlled automatically to move (or scroll) successively to each of the sub-regions which include graphical representations of new items. In this way, when a user selects a particular contact, they are immediately able to view the graphical representations of the new information items. As such, the user is made aware of new items without needing to search for them.

In the above-described embodiments, the future event information items are identified based on category identifiers associated with the selected contact and, optionally, also with the user of the first terminal. In some embodiments, however, the future event information items may be identified, alternatively or additionally, based on a current location or a scheduled future location of the contact. In addition, future event items may be identified based on a current location or a scheduled future location of the user of the first terminal. As such, future event items may be identified so as to be of interest to the contact (and optionally also to the user of the first terminal) and so as to be conveniently located for the contact (and optionally also for the user of the first terminal).

Finally, it will be appreciated that there may be different types of information items to those described above. Examples of other types of information items include, but are not limited to, images, videos and audio clips.

As will be understood from the above description, example embodiments of the present invention collate information items relating to a selected contact and construct and arrange graphical representations of these items in such a way that they can be easily viewed and accessed by the user of the terminal without having to navigate through multiple complex menu systems in multiple different applications. Also, the graphical representations are arranged in such a way that more recent items, which are more likely to be of interest to the user, are more readily accessible. Consequently, example embodiments of the invention reduce the amount of interaction required between the terminal and the user.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   receiving, via a user interface of a user terminal, an indication of a user selection of a contact identifier;
   identifying one or more category indicators associated with the selected contact, the one or more category indicators relating to categories or subjects which are of interest to the selected contact;
   identifying, from plural event information items stored in at least one memory and using the identified one or more category indicators, an event information item which is associated with the selected contact, wherein each of the plural event information items has a timestamp associated therewith, the timestamp indicating the time at which an event is scheduled to take place; and
   causing a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

2. The method of claim 1, comprising:
   identifying, from plural contact information items stored in the at least one memory, a contact information item which is associated with the selected contact identifier, wherein a graphical representation of the identified contact information item is located in a one of the sub-regions of the graphical chronology.

3. The method of claim 2, wherein the graphical representation of the identified contact information item is located in a sub-region which relates to a time interval which includes a current time.

4. The method of claim 2, comprising:
   responding to a user selection of the graphical representation of the contact information item by causing a communication application to be launched, the communication application using the contact information item to allow the user of the user terminal to communicate with a contact associated with the selected contact identifier.

5. The method of claim 1, comprising:
   responding to a user selection of the graphical representation of the event information item by causing information associated with the event information item to be displayed.

6. The method of claim 1, comprising:
   initially causing a first set of the plural sub-regions of the graphical chronology to be displayed, the first set including a sub-region relating to a time interval which includes a current time; and
   subsequently, responding to a user input by causing a second set of the plural sub-regions to be displayed, the second set including at least one different sub-region not included in the first set.

7. The method of claim 6, wherein:
   if the user input indicates a first direction, the at least one different sub-region relates to a time interval which is subsequent to the current time; and
   if the user input indicates a second direction, the at least one different sub-region relates to a time interval which is prior to the current time.

8. The method of claim 1, comprising:
   identifying, from plural other information items stored in the at least one memory, an other information item which is associated with the selected contact and which has an associated timestamp which identifies a time which is subsequent to a time at which the graphical chronology was last caused to be displayed;
   initially causing a first set of sub-regions to be displayed on the display, the first set of sub-regions including a sub-region in which a graphical representation of the identified other information item is located; and
   subsequently causing a second set of sub-regions to be displayed.

9. Apparatus comprising at least one processor and at least one memory having computer-readable instructions stored thereon, the computer-readable instructions, when executed by the at least one processor, causing the apparatus:
   to receive, via a user interface of a user terminal, an indication of a user selection of a contact identifier;
   to identify one or more category indicators associated with the selected contact, the one or more category indicators relating to categories or subjects which are of interest to the selected contact;
   to identify, from plural event information items stored in at least one memory and using the identified one or more category indicators, an event information item which is associated with the selected contact, wherein each of the plural event information items has a timestamp associated therewith, the timestamp indicating the time at which an event is scheduled to take place; and
   to cause a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

10. The apparatus of claim 9, wherein the computer-readable instructions cause the apparatus:
    to identify, from plural contact information items stored in the at least one memory, a contact information item which is associated with the selected contact identifier, wherein a graphical representation of the identified contact information item is located in a one of the sub-regions of the graphical chronology.

11. The apparatus of claim 10, wherein the graphical representation of the identified contact information item is located in a sub-region which relates to a time interval which includes a current time.

12. The apparatus of claim 10, wherein the computer-readable instructions cause the apparatus:
    to be responsive to a user selection of the graphical representation of the contact information item to cause a communication application to be launched, the communication application using the contact information item to allow the user of the user terminal to communicate with a contact associated with the selected contact identifier.

13. The apparatus of claim 9, wherein the computer-readable instructions cause the apparatus:
to be responsive to a user selection of the graphical representation of the event information item to cause information associated with the event information item to be displayed.

14. The apparatus of claim 9, wherein the computer-readable instructions cause the apparatus:
initially, to cause a first set of the plural sub-regions of the graphical chronology to be displayed, the first set including a sub-region relating to a time interval which includes a current time; and
subsequently, to be responsive to a user input to cause a second set of the plural sub-regions to be displayed, the second set including at least different one sub-region not included in the first set.

15. The apparatus of claim 14, wherein:
if the user input indicates a first direction, the at least one different sub-region relates to a time interval which is subsequent to the current time; and
if the user input indicates a second direction, the at least one different sub-region relates to a time interval which is prior to the current time.

16. The apparatus of claim 9, wherein the computer-readable instructions cause the apparatus:
to identify, from plural other information items stored in the at least one memory, an other information item which is associated with the selected contact and which has an associated timestamp which identifies a time which is subsequent to a time at which the graphical chronology was last caused to be displayed;
initially to cause a first set of sub-regions to be displayed on the display, the first set of sub-regions including a sub-region in which a graphical representation of the identified other information item is located; and
subsequently to cause a second set of sub-regions to be displayed.

17. A non-transitory computer-readable medium having computer-readable instructions stored thereon, the computer-readable instructions, when executed by the at least one processor, causing the processor:
to receive, via a user interface of a user terminal, an indication of a user selection of a contact identifier;
to identify one or more category indicators associated with the selected contact, the one or more category indicators relating to categories or subject which are of interest to the select contact;
to identify, from plural event information items stored in at least one memory and using the identified one or more category indicators, an event information item which is associated with the selected contact, wherein each of the plural event information items has a timestamp associated therewith, the timestamp indicating the time at which an event is scheduled to take place; and
to cause a graphical chronology to be displayed on a display of the user terminal, wherein the graphical chronology comprises plural sub-regions each relating to a different time interval, wherein the graphical chronology includes a graphical representation of the identified event information item, the graphical representation being located in a one of the sub-regions based on a comparison of the timestamp associated with the identified event information item and the time interval to which the sub-region relates.

18. The computer-readable medium of claim 17, wherein the computer-readable instructions cause the processor:
to identify, from plural contact information items stored in the at least one memory, a contact information item which is associated with the selected contact identifier, wherein a graphical representation of the identified contact information item is located in a one of the sub-regions of the graphical chronology.

19. The computer-readable medium of claim 18, wherein the graphical representation of the identified contact information item is located in a sub-region which relates to a time interval which includes a current time.

20. The computer-readable medium of claim 18, wherein the computer-readable instructions cause the processor:
to be responsive to a user selection of the graphical representation of the contact information item to cause a communication application to be launched, the communication application using the contact information item to allow the user of the user terminal to communicate with a contact associated with the selected contact identifier.

* * * * *

UNITED STATES PATENT AND TRADEMARK OFFICE
CERTIFICATE OF CORRECTION

PATENT NO. : 9,798,452 B2  
APPLICATION NO. : 14/112163  
DATED : October 24, 2017  
INVENTOR(S) : Keinänen et al.

Page 1 of 1

It is certified that error appears in the above-identified patent and that said Letters Patent is hereby corrected as shown below:

In the Claims

Column 16,
Line 3, Claim 17, "subject" should read --subjects--.
Line 4, Claim 17, "select" should read --selected--.

Signed and Sealed this
Twenty-sixth Day of June, 2018

Andrei Iancu
*Director of the United States Patent and Trademark Office*